Figure 1:
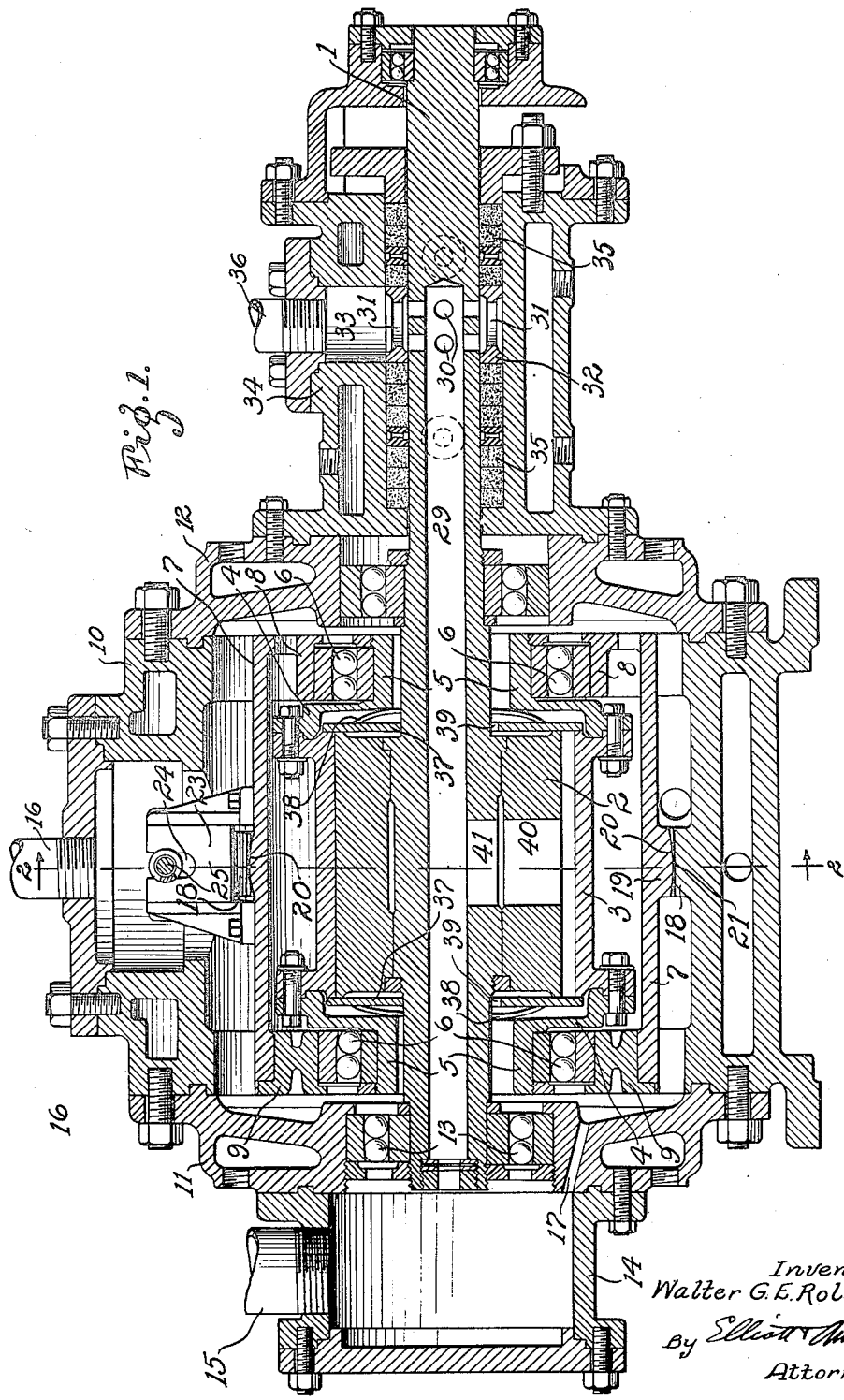

Jan. 9, 1923.

W. G. E. ROLAFF.

SELF ALIGNING SUPPORT FOR CYLINDER BEARINGS OF ROTARY MACHINES.
FILED JUNE 29, 1921.

1,441,375.

2 SHEETS—SHEET 1.

Inventor:
Walter G. E. Rolaff.
By Elliott Thurman
Attorneys.

Patented Jan. 9, 1923.

1,441,375

UNITED STATES PATENT OFFICE.

WALTER G. E. ROLAFF, OF ST. LOUIS, MISSOURI.

SELF-ALIGNING SUPPORT FOR CYLINDER BEARINGS OF ROTARY MACHINES.

Application filed June 29, 1921. Serial No. 481,214.

*To all whom it may concern:*

Be it known that I, WALTER G. E. ROLAFF, a citizen of the United States, residing in the city of St. Louis and State of Missouri, have invented new and useful Improvements in Self-Aligning Supports for Cylinder Bearings of Rotary Machines, of which the following is a specification.

This invention relates to certain new and useful improvements in rotary engines or machines and has special reference to improvements in rotary compressors of the type described and illustrated in my pending application filed December 19th, 1919, Ser.
No. 345,935. It is the general object of the invention to provide a self-aligning support for the housing of such a machine.

In the machine of the application referred to the trunnions of the cylinder were supported in ball-bearing rings which in turn were surrounded by spacer rings, and between these spacer rings and corresponding annularly flanged parts of the casing was inserted a wedge ring eccentrically machined, which when turned had the effect of lowering or raising the cylinder bearings, and, of course, the cylinder.

In the commercial adaptation of this invention it has been found very difficult to so accurately machine the bearing members referred to that the shaft, rotor and cylinder would be truly horizontal or parallel to each other, and it was early found that a very slight variation from a perfect alignment of these parts impaired very seriously the efficient working of the machine. For example, if the shaft were not exactly parallel with the cylinder, the rotor carried by the shaft would not have its circumferential surface engaging the wall of the cylinder uniformly from end to end, but there would be a greater or less divergence between these two parts, and hence compression would be imperfect and the efficiency of the compressor very much lowered. Again, if the rotor and cylinder are not correctly aligned, the floating end plates at either end of the cylinder will not uniformly engage the end edges of the cylinder and rotor, respectively, and thus the sealing efficiency of these end plates will be destroyed or greatly impaired.

In order to overcome these objections and to obviate the necessity of such strictly accurate machine work, I conceived the idea embodied in the present application of mounting the housing supporting the trunnions and bearings of the cylinder centrally of its length instead of at its ends, and in such manner that the housing, or wedge-ring, trunnion bearings and cylinder may readily adjust themselves as a unit to the position of the shaft, so that should the shaft bearings be inaccurate and the shaft not be truly horizontal, or parallel with the axis of the cylinder, such inaccuracy will not produce an incorrect alignment as between the rotor on the shaft and the surrounding cylinder, but owing to the fact that the housing supporting the cylinder is mounted to have a rocking or swinging movement about a center independent of the center of the shaft, the cylinder will be moved to correspond with the movement of the shaft laterally from a true right line position, and thus the relative positions of the rotor and cylinder be unchanged.

The invention is illustrated in the accompanying drawings in which—

Figure 2:
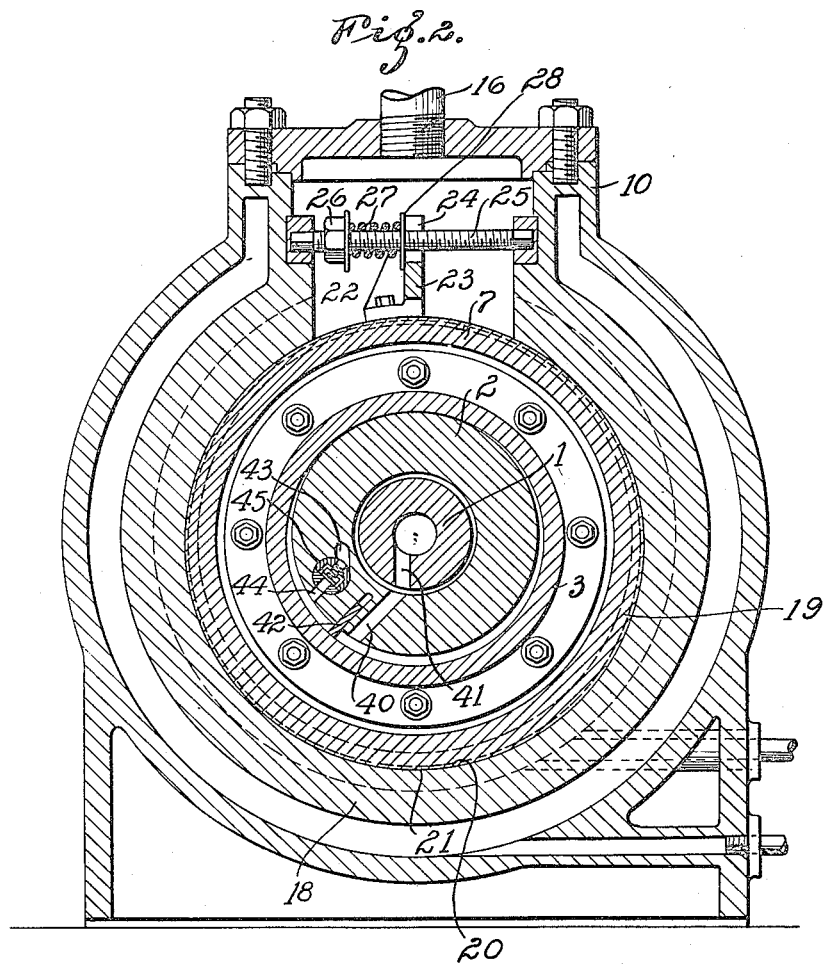

Figure 1 is a longitudinal sectional view through a rotary compressor constructed according to my invention; and Figure 2 is a cross-sectional view on the line 2—2 of Figure 1.

Referring now to these drawings, the numeral 1 indicates a shaft upon which is mounted to rotate therewith, a rotor 2. The rotor 2 is eccentrically mounted in a cylinder 3 the heads 4 of which are provided with trunnions 5 which are mounted in ball bearings 6. The numeral 7 indicates a wedge ring surrounding the cylinder 3 and at one end, the right as shown in Figure 1, is provided with an inwardly extending annular flange 8 which receives the ball bearings 6. At the opposite end the ball bearings are supported in position by a spacing ring 9 inserted and suitably secured in the end of the wedge ring 7. The wedge ring 7, except for a central circular projection on its periphery, to be later referred to, is cylindrical in shape and is rotatively mounted on said projection within the main casing of the machine in a manner to be presently described. The numeral 10 indicates the main casing of the machine which is closed at either end by end plates 11, 12. Centrally of the end plate 11 are mounted ball bearings 13 which support one end of the shaft 1, and mounted on the end of plate 11 and surrounding the aperture for the ball bearings is a housing 14 from which leads an outlet pipe 15 to which is connected the discharge pipe 16 from the casing. The purpose of the casing 14 is to receive any oil globules which may pass out through the bearings, or otherwise, with the compressed gas and an inclined port 17 is provided in the end plate 11 communicating with the housing 14 at the bottom thereof to permit the return of such oil to the casing. The inner wall of the casing 10 is provided centrally of its length with an annular flange 18 constituting a ring bearing, and the bearing face of which is flat. Centrally of its length the wedge ring 7 is provided with an annular peripheral projection 19 having a transversely curved surface 20, which has a rocking bearing or engagement with the flat bearing surface 21 of the flange 18. The transverse curve of the surface 20 of the projection 19 is struck from the center of the diameter of the said projection and since, therefore, the said transverse curve has the radius of the circumference of the projection 19, the entire projection is a segment of a true sphere, and because of this, no matter at what angle this segment bears within the flat surface of the annular ring 18, the contact between the two will remain absolutely the same, even though the segment of the sphere be pivoted from any point whatsoever within its own diameter. The annular flange 19 and the bearing ring 18 have a certain eccentric relation to each other and to the cylinder and rotor, in order to permit of take-up adjustment by rotation of the wedge ring 7, and this relation of the parts will now be described.

The center of the shaft 1 and rotor 2 are, of course, identical; and since the cylinder 3 is located eccentrically with respect to the shaft, I first have the center of the cylinder eccentric to the center of the shaft to the amount of one-half the difference in diameters of the rotor and cylinder. For example, if the cylinder is 7" in diameter and the rotor 6", the center of the cylinder will be ½" off of the center of the shaft or rotor. In assembling the machine, it is necessary, of course, to be able to place the rotor in the cylinder out of contact with the wall thereof, and means must be provided for securing accurate and uniform adjustment of the cylinder to raise or lower it so as to bring its wall into operative engagement with the periphery of the rotor throughout a given line of contact. Assuming that the amount of adjustment desired should be ¼", I first provide the annular bearing ring 18 with an eccentricity of ¼" relative to the center of the shaft and in the same direction as the eccentricity of the cylinder. To secure the take-up of ¼" which is provided for by the circular projection 19 on the wedge ring, the said projection is formed with its center ¼" off the center of the cylinder and in the same direction that the center of the cylinder is off the center of the shaft. As a result of these eccentric relations, by turning the wedge ring 7, which is rotatably mounted within the casing, the cylinder bearings, and, of course, the cylinder, may be raised or lowered, which makes it possible to get working contact between the rotor and the cylinder within a very wide range of adjustment. Incidentally, the adjustment of the cylinder and the adjustment of the wedge ring will also vary the position of the line of contact between the rotor and cylinder.

As shown by Figure 2, the inner wall of the casing is cut away longitudinally to provide a clearance space 22 projecting upward in which, from the wedge ring, is an arm 23 which is bifurcated at its upper end as indicated at 24. Extending across the space 22 and non-rotatably mounted at its ends in a suitable manner in the walls thereof, is a screw-threaded take-up stem 25 which extends through the bifurcation 24, and mounted on one end portion of which is a take-up nut 26. This nut bears against one end of a coil spring 27 surrounding the stem 25, the other end of which spring bears against a washer 28 bearing against the side of the arm 23. By turning the nut 26, the arm 23 and hence the wedge-ring 7 will be turned to vary the relation of the annular projection on the wedge-ring with respect to the annular bearing-ring on the casing and thereby raise or lower the cylinder bearings and cylinder.

The gas is introduced into the cylinder and compressed as follows:

The shaft 1 is hollow for a greater portion of its length, as indicated at 29, and near one end of this hollow portion is provided with a plurality of transverse apertures 30 which communicate in rotation with relatively large apertures 31 in a gland 32. One of these apertures 31 communicates with a port 33 provided in a supplemental casing member 34 which is mounted on the end plate 12 and provides space for packing, 35, for the shaft 1 on either side of the duct 33. Communicating with this duct is an inlet pipe 36 which in a preferred embodiment of my invention, leads from the low pressure side of a refrigerating system. As in the case of the construction shown in my pending application, floating heads 37 close the ends of the cylinder 3. These heads are loosely mounted within the ends 4 of the cylinder and are in no way fastened to either the trunnions thereof, the cylinder or the rotor. They are supported and held in place by small springs 38. The central opening 39 of each head 37 is of greater diameter than the shaft 1 to provide an opening for the escape of the compressed gas and the flow of the oil from the spaces between the ends of the cylinder and the heads. Centrally of its length the rotor 2 is provided with a tangential port 40 which communicates with a similar port 41 leading through one side of the shaft from the interior thereof. Beyond the port 40 the rotor 2 is slotted to receive a blade 42 and beyond this blade a discharge port 43 extends through the rotor from end to end thereof with which communicates a tangential port 44 leading from the periphery of the rotor, a spring-pressed valve 45 normally closing the port 44.

In operation, as the rotor is rotated gas is drawn into the hollow shaft through the ports 30 and enters the cylinder 3 through the suction port 40. As the shaft is rotated the space behind the blade 42 becomes larger while the space in front of the blade becomes smaller. The gas taken into the displacement space during one revolution is discharged through the port 44 during the next revolution. Both suction and compression occur in each revolution. The gas discharged through the port 44 enters the port 43 and is discharged at either end of the cylinder behind the floating heads, and passing out through the openings 39 enters the casing and thence passes out through the discharge pipe 16 and is delivered to the pipe system, in the case of refrigeration, or to a container, in the case of simple compression, as of air. Certain details relating to the oiling system are herein shown in part but are not specifically described for the reason that they form no part of this invention. Also the operation of the compressor, as a whole, is exactly the same as described and claimed in my pending application referred to and it is thought the brief reference to the operation herein given is sufficient for the purpose of the present case, the invention of which is concerned wholly with the manner of mounting the cylinder housing of the rotary cylinder, and the type of machine shown being selected as showing one embodiment of the invention.

Referring now to the main feature of the invention, it will be readily seen that if the bearings of the shaft 1 should be slightly off line, this will not in any manner interfere with the correct position of the rotor within the cylinder for the reason that as the curved surface of the annular projection 19 is struck from the center of the projection itself, any lateral displacement of the shaft will simply cause the projection to correspondingly adjust itself on the flat surface of the annular ring 18 and the cylinder and bearings will be correspondingly adjusted, and there will be no tendency for the relative position between the rotor and cylinder to be changed.

I claim:—

1. In a machine of the class described, in combination with a casing having a shaft rotatably mounted therein, a rotor carried by said shaft, a cylinder surrounding said rotor and having its bore eccentric to the axis of the shaft, a rotatable housing surrounding the cylinder and affording bearings therefor, a central peripheral circular projection on said housing, and a corresponding annular flange provided on the interior of said casing and forming a bearing surface for said projection, the meeting surfaces of said projection and flange being eccentric to the axis of said shaft in the same direction as the eccentricity of the cylinder thereto, whereby, upon rotating the said housing the cylinder bearings and cylinder may be raised or lowered to secure contact of the rotor with the wall of the cylinder.

2. In a machine of the class described, in combination with a casing having a shaft rotatably mounted therein, a rotor carried by said shaft, a cylinder surrounding said rotor and having its bore eccentric to the axis of the shaft, a rotatable housing surrounding the cylinder eccentrically to the axis of the shaft and affording bearings for the cylinder, a central peripheral circular projection on said housing and a corresponding annular flange provided on the interior of said casing and forming a bearing surface for said projection, the meeting surfaces of said projection and flange being eccentric to the axis of said shaft in the same direction as the eccentricity of the cylinder thereto, whereby, upon rotating the said housing the cylinder bearings and cylinder may be raised or lowered to secure contact of the rotor with the wall of the cylinder.

3. In a machine of the class described, in combination with a casing having a shaft rotatably mounted therein, a rotor carried by said shaft, a cylinder surrounding said rotor and having its bore eccentric to the axis of the shaft, a rotatable housing surrounding the cylinder eccentrically to the axis of the shaft and affording bearings for the cylinder, the eccentricity of the housing being in the same direction, as that of the cylinder and substantially to the same extent, a central peripheral circular projection on said housing, the periphery of which is eccentric to the shaft to a greater extent than the eccentricity of the cylinder and housing thereto, and in the same direction, and a corresponding annular flange provided on the interior of said casing and forming a bearing surface for said projection which is eccentric to the extent and in the same direction as the eccentricity of said circular projection, whereby, upon rotating the said housing, the cylinder bearings and cylinder may be raised or lowered to secure contact of the rotor with the wall of the cylinder.

4. In a machine of the class described, in combination with a casing having a shaft rotatably mounted therein, a rotor carried by said shaft, a cylinder surrounding said rotor and having its bore eccentric to the axis of the shaft, a rotatable housing surrounding the cylinder and affording bearings therefor, a central peripheral circular projection on said housing, and a corresponding annular flange provided on the interior of said casing and forming a continuous flat bearing surface for said projection, the surface of said projection being transversely curved on an arc struck from the center of the projection, and the meeting surfaces of said projection and flange being eccentric to the axis of said shaft, in the same direction as the eccentricity of the cylinder thereto, whereby, upon rotating the said housing, the cylinder bearings and cylinder may be raised or lowered to secure contact of the rotor with the wall of the cylinder, and whereby, upon lateral displacement of the shaft from a right line position with respect to the theoretical axis of the cylinder the said housing will adjust itself upon said annular bearing to correspond with the incline of the shaft.

5. In a machine of the class described, in combination with a casing having a shaft rotatably mounted therein, a rotor carried by said shaft, a cylinder surrounding said rotor and having its bore eccentric to the axis of the shaft, a rotatable housing disposed eccentrically to the shaft in the same direction as the cylinder, surrounding the cylinder and affording bearings therefor, a central peripheral circular projection on said housing, the periphery of which is eccentric to the axis of the shaft to a greater extent than the eccentricity of the cylinder and housing thereto and in the same direction, and an annular flange provided on the interior of said casing and forming a continuous bearing surface for said projection eccentric to the axis of the shaft in the same direction and to the same extent as the eccentricity of said projection, whereby, upon rotating the said housing the cylinder bearings and cylinder may be raised or lowered to secure contact of the rotor with the wall of the cylinder.

6. In a machine of the class described, in combination with a casing having a shaft rotatably mounted therein, a rotor carried by said shaft, a cylinder surrounding said rotor and having its bore eccentric to the axis of the shaft, a rotatable housing surrounding the cylinder and affording bearings therefor, a central peripheral circular projection on said housing the periphery whereof is transversely curved on an arc struck from the center of the diameter of said projection, and an annular flange provided on the interior of said casing and having a continuous flat bearing surface for said projection, whereby said housing may adjust itself to correspond with lateral displacement of the shaft from its true right line position.

7. In a machine of the class described, in combination with a casing having a shaft rotatably mounted therein, a rotor carried by said shaft, a cylinder surrounding said rotor and having its bore eccentric to the axis of the shaft, a rotatable housing disposed eccentrically to the shaft in the same direction as the cylinder surrounding the cylinder and affording bearings therefor, a central peripheral circular projection on said housing, the periphery whereof is transversely curved on an arc struck from the center of the diameter of the projection, and on any cross-section thereof is eccentric to the axis of said shaft in the same direction as the cylinder, an annular flange on the interior of the casing providing a circular flat bearing surface surrounding and engaging said projection and also eccentric to the axis of said shaft, in the same direction and to the same extent as the eccentricity of said projection, whereby, upon rotating the said housing the cylinder bearings and cylinder may be raised or lowered to secure contact of the rotor with the wall of the cylinder, and whereby upon displacement of the shaft from its true right line position the said housing may correspondingly adjust itself to permit a parallel relation between the rotor and the wall of the cylinder to be maintained.

In testimony whereof, I have hereunto set my hand.

WALTER G. E. ROLAFF.